(12) United States Patent
Sugiyama et al.

(10) Patent No.: US 9,458,018 B2
(45) Date of Patent: Oct. 4, 2016

(54) APPARATUS AND METHOD FOR PRODUCING NANOCARBON MATERIAL

(71) Applicant: MITSUBISHI HEAVY INDUSTRIES, LTD., Tokyo (JP)

(72) Inventors: Tomoaki Sugiyama, Tokyo (JP); Kiyoshi Tatsuhara, Tokyo (JP); Ikumasa Koshiro, Tokyo (JP); Atsushi Tanaka, Tokyo (JP); Yasushi Mori, Tokyo (JP); Takashi Kurisaki, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 14/375,284

(22) PCT Filed: Feb. 26, 2013

(86) PCT No.: PCT/JP2013/054955
§ 371 (c)(1),
(2) Date: Jul. 29, 2014

(87) PCT Pub. No.: WO2013/129392
PCT Pub. Date: Sep. 6, 2013

(65) Prior Publication Data
US 2014/0369921 A1 Dec. 18, 2014

(30) Foreign Application Priority Data

Feb. 29, 2012 (JP) .................. 2012-044577

(51) Int. Cl.
*C01B 31/02* (2006.01)
*B01J 8/24* (2006.01)
(Continued)

(52) U.S. Cl.
CPC .............. *C01B 31/0293* (2013.01); *B01J 8/24* (2013.01); *C01B 31/0206* (2013.01);
(Continued)

(58) Field of Classification Search
CPC ............ C01B 31/022; C01B 31/0206; C01B 31/0233; C01B 31/0293; D01F 9/127; D01F 9/133; B01J 8/24; B01J 37/18; B01J 23/6525; B01J 23/6527; B01J 23/76; B01J 23/88; B01J 23/8872; B01J 23/888; B01J 23/8885; B82Y 40/00
USPC ........................................ 423/447.3
See application file for complete search history.

(56) References Cited

U.S. PATENT DOCUMENTS 6,413,487 B1 7/2002 Resasco et al.
2005/0074392 A1* 4/2005 Yang et al. ................ 423/447.3

FOREIGN PATENT DOCUMENTS

JP 3100962 10/2000
JP 2001-139317 5/2001
(Continued)

OTHER PUBLICATIONS

International Search Report issued Apr. 2, 2013 in International (PCT) Application No. PCT/JP2013/054955 with English translation.

(Continued)

*Primary Examiner* — Daniel C McCracken
(74) *Attorney, Agent, or Firm* — Wenderoth, Lind & Ponack, L.L.P.

(57) ABSTRACT

Catalyst support means for producing a fluid catalyst; a reduction basin that pretreats an active metal of the obtained fluid catalyst in a reducing atmosphere; a fluid bed reactor which is supplied with a reduction-treated fluid catalyst having undergone the reduction, for producing a nanocarbon material; and a moisture application basin for supplying a slight amount of moisture to a source gas to be supplied to the aforementioned fluid bed reactor are provided.

11 Claims, 5 Drawing Sheets

(51) Int. Cl.
*D01F 9/127* (2006.01)
*D01F 9/133* (2006.01)
*B01J 37/18* (2006.01)
*B01J 23/652* (2006.01)
*B01J 23/76* (2006.01)
*B01J 23/88* (2006.01)
*B01J 23/887* (2006.01)
*B01J 23/888* (2006.01)
*B82Y 40/00* (2011.01)

(52) U.S. Cl.
CPC .......... *C01B 31/0233* (2013.01); *D01F 9/127* (2013.01); *D01F 9/133* (2013.01); *B01J 23/6525* (2013.01); *B01J 23/6527* (2013.01); *B01J 23/76* (2013.01); *B01J 23/88* (2013.01); *B01J 23/888* (2013.01); *B01J 23/8872* (2013.01); *B01J 23/8885* (2013.01); *B01J 37/18* (2013.01); *B82Y 40/00* (2013.01)

(56) References Cited

FOREIGN PATENT DOCUMENTS

| | | |
|---|---|---|
| JP | 2001-520615 | 10/2001 |
| JP | 2003-535794 | 12/2003 |
| JP | 2004-76197 | 3/2004 |
| JP | 2004-076197 | 3/2004 |
| JP | 2011-46611 | 3/2011 |
| WO | 2006/011655 | 2/2006 |

OTHER PUBLICATIONS

Written Opinion of the International Searching Authority issued Apr. 2, 2013 in International (PCT) Application No. PCT/JP2013/054955 with English translation.
Office Action issued Nov. 4, 2015 in corresponding Japanese Patent Application No. 2012-044577 with English translation.
Office Action issued Mar. 1, 2016 in corresponding Japanese Application No. 2012-044577 with English translation.
Decision of Patent Grant issued Jun. 28, 2016 in corresponding Japanese Patent Application No. 2012-044577 with English Translation.

* cited by examiner

APPARATUS AND METHOD FOR PRODUCING NANOCARBON MATERIAL

FIELD

The present invention relates to an apparatus and a method for producing a nanocarbon material capable of producing a high-purity nanocarbon material.

BACKGROUND

In conventional techniques, in regard to nanocarbon materials such as carbon nanotubes or carbon nanofibers, various production methods such as a gas-phase pyrolysis process, a laser sublimation process, and a condensed-phase electrolytic process as well as an arc process have been proposed (Patent Literatures 1 to 3).

On the other hand, the present applicant has previously proposed an apparatus and a method for producing a nano-sized carbon material with the use of a fluid bed reactor as a method for producing nanocarbon materials in large amounts (Patent Literature 4).

In the production of a nanocarbon material with the use of this fluid bed reaction process, a fluid catalyst, serving both as a fluid material and a catalyst, employs secondary particles obtained by granulating and grain-coarsening primary particles so as to configure a bubble-rising type fluid bed reactor. A sufficient amount of reaction time for the catalyst particles is taken. The nanocarbon material with the catalyst obtained in the fluid bed reaction device is then subjected to acid washing for removal in order to separate and remove the catalyst used during the production thereof.

CITATION LIST

Patent Literature

Patent Literature 1: Japanese Patent No. 3100962
Patent Literature 2: Japanese Translation of PCT International Application Publication No. 2001-520615
Patent Literature 3: Japanese Patent Application Laid-open No. 2001-139317
Patent Literature 4: Japanese Patent Application Laid-open No. 2004-76197

SUMMARY

Technical Problem

Figure 5:
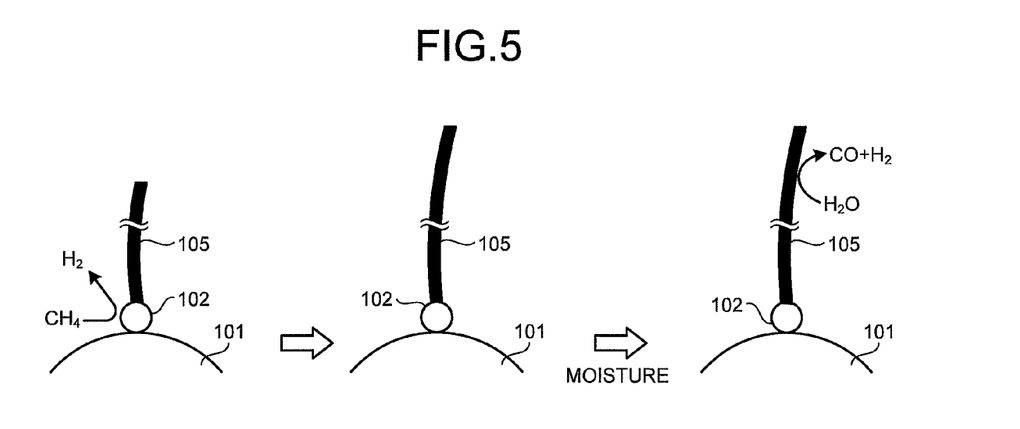
FIG. 5 is a schematic diagram illustrating states in which a nanocarbon material is being grown from a metal catalyst which is an active component.

FIG. 5 is a schematic diagram illustrating states in which a nanocarbon material is being grown from a metal catalyst which is an active component. As shown in FIG. 5, a carbon-based source gas (methane: $CH_4$) grows a nanocarbon material 105 due to the catalytic function of an active metal 102. If moisture is present during the growth thereof, however, the moisture attacks the periphery of the nanocarbon material 105 to gasify ($CO+H_2$) the nanocarbon material 105. Part of the grown nanocarbon material 105 thereby disappears, thus resulting in a problem of lowering the yield of the nanocarbon material.

In view of the aforementioned problem, it is an object of the present invention to provide an apparatus and a method for producing a nanocarbon material with which the yield of a nanocarbon material is not lowered in a fluid bed reactor.

Solution to Problem

According to a first aspect of the present invention in order to solve the above problems, there is provided a method for producing a nanocarbon material, comprising: a reduction step of reducing a fluid catalyst having an active metal; and a generation step of growing a nanocarbon material in the active metal of the fluid catalyst by supplying the reduced fluid catalyst, a source gas, and moisture to a fluid bed.

According to a second aspect of the present invention, there is provided the method for producing a nanocarbon material according to the first aspect, wherein a reducing agent in the reduction step is hydrogen, $NH_4$, silane, or disilane.

According to a third aspect of the present invention, there is provided the method for producing a nanocarbon material according to the first or second aspect, wherein for the moisture, a ratio of the moisture/the source gas is in a range of 0.0002 to 0.0008.

According to a fourth aspect of the present invention, there is provided the method for producing a nanocarbon material according to any one of the first to third aspects, wherein the fluid catalyst having the active metal is granulated so as to have a particle size in a range of 0.05 to 10 mm.

According to a fifth aspect of the present invention, there is provided the method for producing a nanocarbon material according to any one of the first to fourth aspects, wherein the reduced fluid catalyst is transferred to the generation step while maintaining a state to prevent reoxidation.

According to a sixth aspect of the present invention, there is provided the method for producing a nanocarbon material according to any one of the first to fifth aspects, wherein in the generation step, the moisture supplied to the fluid bed causes amorphous carbon generated in the active metal to disappear.

According to a seventh aspect of the present invention, there is provided an apparatus for producing a nanocarbon material, comprising: a reduction basin for reducing an active metal; a fluid bed reactor for growing a nanocarbon material by means of a reduction-treated fluid catalyst having undergone reduction; a gas line for supplying a source gas to the fluid bed reactor; and a moisture application part for supplying a slight amount of moisture to the fluid bed reactor.

Advantageous Effects of Invention

According to the present invention, the granulated catalyst is supplied to the inside of the fluid bed reactor with the catalyst being in a metal state obtained by reducing an active component thereof in the reduction basin to remove an oxide thereof. Consequently, the active metal catalyst in the exposed metal state is present on a carrier. Thus, no moisture is generated in the reactor during the production of the nanocarbon material, thereby eliminating the disappearance of the grown single-layered or multi-layered nanocarbon material.

Moreover, according to the present invention, directly introducing a slight amount of moisture into the reaction vessel together with the source gas can cause amorphous carbon with which the metal supported on the carrier is covered to disappear and to suppress the aggregation of nanocarbon materials. Thus, the generation of amorphous carbon, which is an impurity, can be suppressed, the catalytic activity can be maintained for a long period of time, and the nanocarbon material having high conductive property can be obtained at a high yield.

DESCRIPTION OF EMBODIMENTS

An object of the present invention is to suppress deterioration in catalytic activity due to the generation of amorphous carbon in a catalyst, which is an active metal, by reducing the catalyst, which is an active metal, during the growth of a nanocarbon material and controlling a moisture amount during the growth. A further object of the present invention is to grow an independently-existing single-layered or multi-layered nanocarbon material.

The present invention will now be described below in detail with reference to the drawings. Note that the present invention should not be limited by the embodiments.

(First Embodiment)

Figure 1:
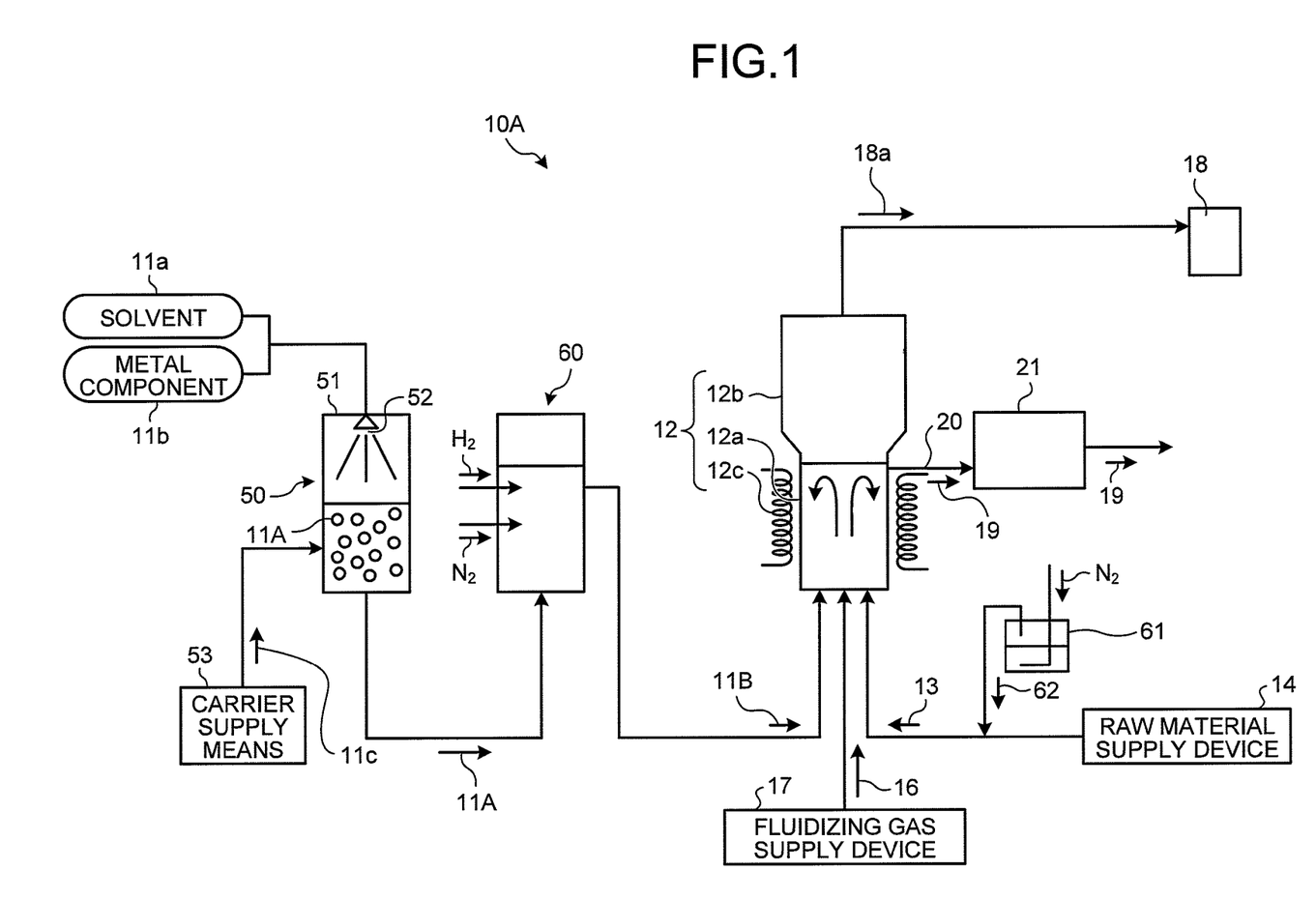
FIG. 1 is a diagrammatic illustration of an apparatus for producing a nanocarbon material according to a first embodiment.

An apparatus for producing a nanocarbon material according to an embodiment of the present invention will be described with reference to the drawings. FIG. 1 is a diagrammatic illustration of the apparatus for producing a nanocarbon material according to the first embodiment.

Herein, a catalyst for producing a nanocarbon material, which is a secondary particle with a predetermined particle size obtained by compacting a primary particle made of a carrier (magnesium oxide: MgO) supporting an active component (iron: Fe), is used as a fluid catalyst achieving both a catalytic function and a fluid function in the present embodiment.

As shown in FIG. 1, an apparatus 10A for producing a nanocarbon material according to the present embodiment includes: catalyst support means 50 for producing a fluid catalyst 11A; a reduction basin 60 that pretreats the active metal of the obtained fluid catalyst 11A in a reducing atmosphere; a fluid bed reactor 12 which is supplied with a reduction-treated fluid catalyst 11B having been reduced, for producing a nanocarbon material; and a moisture application basin 61 for supplying a slight amount of moisture to a source gas to be supplied to the aforementioned fluid bed reactor 12.

Herein, the aforementioned catalyst support means 50 is provided for producing the fluid catalyst 11A. The catalyst support means 50 supplies a solvent 11a and a metal component 11b into a basin body 51 from a nozzle 52 and causes a carrier 11c supplied from carrier supply means 53 to support the metal component 11b which is a catalyst.

If a particle size of this fluid catalyst 11A is small, the particle size may be increased with granulation means for bonding the fluid catalyst particles together.

Herein, instead of using a fine-particle catalyst as it is, after producing the fine-particle catalysts, granulation is performed thereon with a catalyst granulation device (not shown). Thereafter, the particle sizes thereof are equalized. The particle size of the catalyst fine particles for producing a nanocarbon material is in a range of 0.05 to 10 mm and preferably in a range of 0.4 to 2.0 mm, for example. This is because preventing the catalysts from flying apart by a fluidizing gas is preferred in the case of the fluid bed reaction process.

Also, the reduction basin 60 is provided for supplying hydrogen and nitrogen into the basin body and performing the reduction treatment on the obtained fluid catalyst 11A.

Here, since the metal component of the fluid catalyst 11A when obtained at the catalyst support means 50 is in a metal-oxide state, the reduction treatment is performed in the present invention in order to make the metal portion exposed, from the oxide state into a metal state.

While hydrogen is used as a reducing agent in the present embodiment, any reducing agent can be used as long as it changes a metal oxide into a metal state. Besides hydrogen, a reducing agent such as a compound containing hydrogen (for example, $NH_4$, hydrogen halide, or the like), silane, or disilane can be used.

It is preferable that temperature conditions when performing the reduction treatment in the reduction basin 60 be set in a range of 600 to 900° C., more preferably at around 800° C.

The reason for obtaining the metal state by means of the treatment in the reducing atmosphere prior to being supplied to the fluid bed reactor 12 in the present invention is as follows.

According to a conventional bad reaction in which a catalyst is in an oxide state, moisture is generated in the fluid bed reactor 12 during the growth of a nanocarbon material due to the catalytic reaction between a hydrocarbon gas and a metal catalyst as shown in the following formula (1) (Note that the description in parentheses denotes the metal catalyst for facilitating the reaction.). The generated moisture is responsible for the disappearance of the grown nanocarbon material as shown in FIG. 5.

$$(FeO)+CH_4 \rightarrow C \text{ (nanocarbon material)}+H_2O \qquad (1)$$

According to the reaction when the reduction treatment is performed in accordance with the present invention, on the other hand, no moisture is generated during the production as shown in the following formula (2).

$$(Fe)+CH_4 \rightarrow CNT+2H_2 \qquad (2)$$

Consequently, the excellent growth of the nanocarbon material is facilitated in the fluid bed reactor 12.

Since a carbon raw material, methane, which is a source gas, serves as a reducing agent, the reducing atmosphere is maintained in the fluid bed reactor 12. Thus, the metal catalyst maintains its metal state.

Note however that amorphous carbon, which is an impurity, is formed in the metal catalyst if the moisture in the fluid bed reactor 12 is zero, whereby the catalyst is prone to lose its activity due to the catalyst metal covered with the amorphous carbon. Thus, a slight amount of moisture is added to remove the amorphous carbon and thereby suppress deterioration in the catalytic activity.

Figure 4:
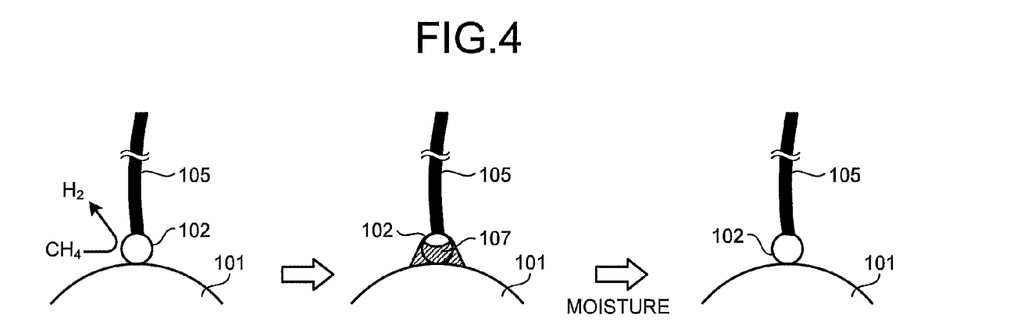
FIG. 4 is a schematic diagram illustrating a process of removing amorphous carbon with moisture when covered with the amorphous carbon during the growth of a nanocarbon material.

FIG. 4 is a schematic diagram illustrating a process of removing amorphous carbon 107 with moisture when the active metal 102 is covered by the amorphous carbon 107 during the growth of the nanocarbon material 105. Note that the reference numeral 101 denotes a carrier supporting the active metal 102.

As shown in FIG. 4, when the nanocarbon material 105 is grown from the active metal 102, the periphery of the active metal 102 may be covered with the amorphous carbon 107, thereby inhibiting the growth of the nanocarbon material 105.

A slight amount of added water attacks such amorphous carbon to cause the amorphous carbon to disappear, thereby facilitating the sound growth of the nanocarbon material. The reason why this amorphous carbon portion disappears is that the amorphous carbon formed in the catalyst disappears at a lower temperature than the portion of the grown nanocarbon material. The amorphous carbon disappears as a result of oxidation by the moisture (water vapor) injected into the temperature atmosphere for the nanocarbon generation.

In order to cause the amorphous carbon to disappear, the amount of moisture added is preferably a very small amount. If the amount of moisture added is excessive, the nanocarbon material also disappears together with the amorphous carbon. Consequently, aggregated nanocarbon materials are generated relatively more. Thus, it is required to control an optimum moisture amount and catalytic activity. The results of the experiments about such moisture addition ratio and catalytic activity are shown in FIG. 3.

Methane was used as a source gas.

Figure 3:
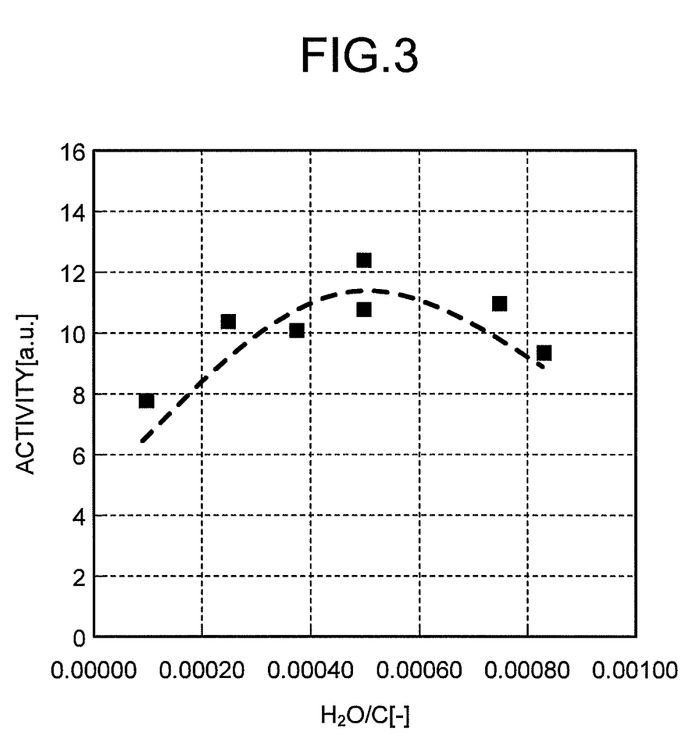
FIG. 3 is a relationship diagram between a moisture addition ratio and an activity.

As shown in FIG. 3, it was found out that the catalytic activity was excellent and preferable when a ratio of $H_2O$ (400 ppm)/source ($CH_4$: 80%) gas is in a range of 0.0002 to 0.0008.

Figure 6:
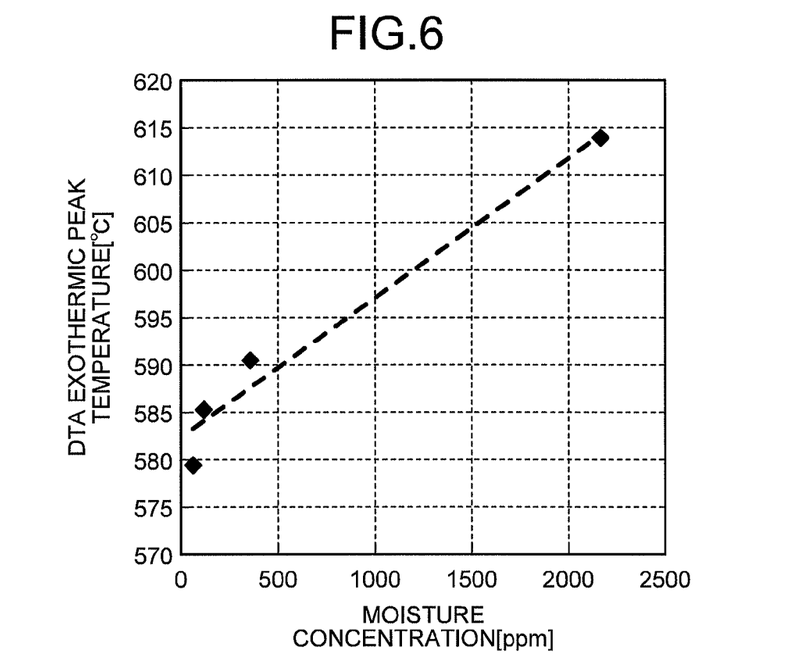
FIG. 6 is a graph showing a relationship between a moisture concentration and DTA exothermic peak temperature.

FIG. 6 is a graph showing a combustibility of the generated nanocarbon material according to a moisture concentration. Here, the horizontal axis in FIG. 6 represents a moisture concentration (ppm) and the vertical axis thereof represents a DTA (differential thermal analysis) exothermic peak temperature (° C.).

Figure 7:
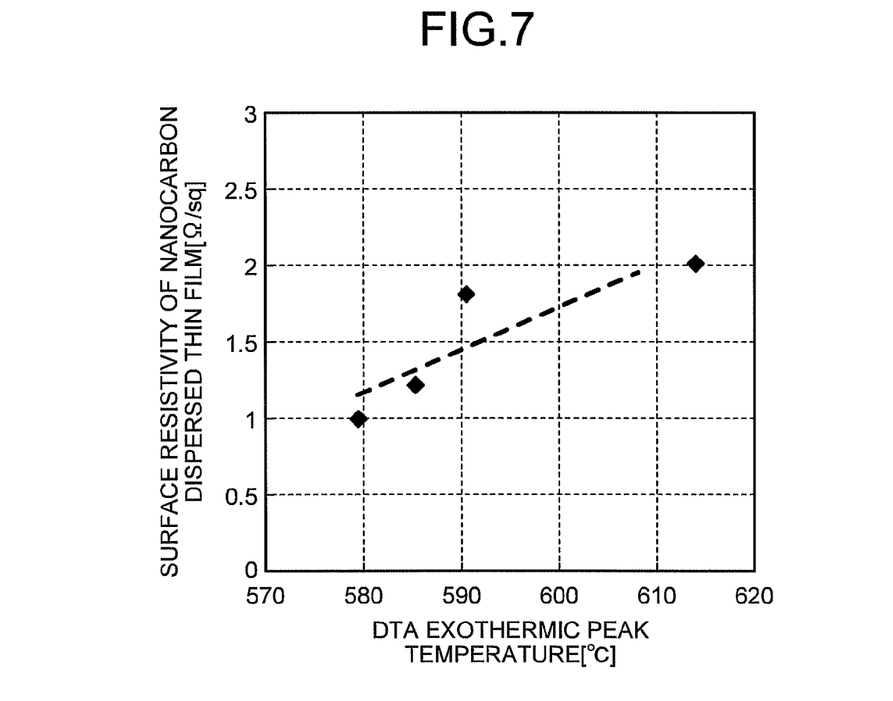
FIG. 7 is a graph showing a relationship between DTA exothermic peak temperature and surface resistivity of nanocarbon disperse thin film.

FIG. 7 is a graph showing a surface resistivity of a thin film to which nanocarbons are added. Here, the horizontal axis in FIG. 7 represents a DTA (differential thermal analysis) exothermic peak temperature (° C.) and the vertical axis thereof represents a surface resistivity ($\Omega$/sq) of the nanocarbon dispersed thin film.

In FIG. 6, generation states of nanocarbon materials according to moisture concentrations measured at an outlet of the fluid bed reactor are analyzed. Along with an increase in the moisture concentration at the outlet of the fluid bed reactor, the combustion peak temperature (DTA exothermic peak temperature) of the nanocarbon is shifted to the high-temperature side. In other words, it shows that the nanocarbons disappear due to the moisture concentration in the source gas and aggregated nanocarbon materials hard to disappear (having a higher combustion peak temperature) are generated relatively more.

Moreover, as shown in FIG. 7, it can be seen that a thin film to which nanocarbons having a higher combustion peak temperature (DTA exothermic peak temperature) are added has an increased resistivity, thus being unsuitable for use as a nanocarbon material for giving a conductive property.

In order to generate high-purity nanocarbon materials, it is necessary to generate many independently-existing nanocarbon materials. Thus, as shown in FIG. 3, a ratio of $H_2O$ (400 ppm)/source ($CH_4$: 80%) gas is preferably in a range of 0.0002 to 0.0008 in terms of the catalytic activity. However, in order to generate a high-purity nanocarbon material having less aggregation and an excellent conductive property, a range of 0.0002 to 0.0005 is more preferred.

A high-purity nanocarbon material can be generated by adding a slight amount of moisture to a source gas or reactor during the generation thereof. The high-purity nanocarbon material has a high conductivity and is used as a material for giving a conductive property in a semiconductor device, wiring, a transparent conductive film, a battery, a metal composite, a wire, an organic resin, a conductive coating material, or the like.

The aforementioned fluid bed reactor 12 is configured by a fluid bed reacting part 12a, a freeboard part 12b, and a heating part 12c. A carbon raw material 13 is supplied to the fluid bed reactor 12 from a raw material supply device 14.

In the present embodiment, a slight amount of moisture is applied to the carbon raw material 13 supplied from the raw material supply device 14 by the moisture application basin 61.

Nitrogen is bubbled in the moisture application basin 61 and a slight amount of moisture is added to the source gas (methane), which is a carbon raw material, to obtain a moisture-containing gas 62.

Note that moisture may be directly supplied to the fluid bed reactor 12.

Moreover, the fluid bed reactor 12 is configured by: the fluid bed reacting part 12a filled with a fluid catalyst 11B; the freeboard part 12b having a space through which the fluid catalyst 11B, which is a fluid material in the aforementioned fluid bed reacting part 12a, scatters and flows down; and the heating part 12c for heating the fluid bed reacting part 12a. A flue gas 18a discharged from the freeboard part 12b is treated by a flue gas treating device 18. Moreover, the freeboard part 12b preferably has a flow passage cross-sectional area larger than that of the fluid bed reacting part 12a.

A nanocarbon material 19 with catalyst discharged from the aforementioned fluid bed reacting part 12a is drawn by a recovery line 20 and recovered by a recovery unit 21.

Here, while the fluid bed reaction mode in the aforementioned fluid bed reacting part 12a is either a bubble fluid bed type or an entrained fluid bed type, any of these can be employed in the present invention.

The carbon raw material 13, which is a source gas, supplied from the aforementioned raw material supply device 14 may be any compound as longus it contains carbon. Examples of such a compound may include, in addition to CO and $CO_2$, alkanes such as methane, ethane, propane, and hexane, unsaturated organic compounds such as ethylene, propylene, and acetylene, aromatic compounds such as benzene and toluene, organic compounds having an oxygen-containing functional group such as alcohols, ethers, and carboxylic acids, polymer materials such as polyethylene and polypropylene, and petroleum and coal (including a coal conversion gas). However, the present invention is not limited to these. Alternatively, for the sake of oxygen concentration control, two or more of oxygen-containing carbon sources such as CO, $CO_2$, alcohols, ethers, and carboxylic acids and oxygen-free carbon sources may be combined together and supplied.

The carbon raw material 13 is supplied in a gas state to the inside of the fluid bed reacting part 12a and undergoes a uniform reaction as a result of stirring by the fluid catalyst 11B which is a fluid material to grow the nanocarbon material. At this time, an inert gas is separately introduced into the fluid bed reacting part 12a as a fluidizing gas 16 by a fluidizing gas supply device 17 so as to achieve predetermined fluid conditions.

Thereafter, the inside of the fluid bed reacting part 12a is set in a temperature range of 300° C. to 1300° C., more preferably in a temperature range of 400° C. to 1200° C., by the heating part 12c of the fluid bed reactor 12. The nanocarbon material is synthesized by allowing the carbon raw material 13 such as methane to be in contact with the catalyst for a certain period of time under a coexistence environment with an impurity carbon decomposed matter.

The flue gas 18a discharged from the freeboard part 12b is subjected to a flue gas treatment at the flue gas treating device 18. At this time, fine particles may be separated therefrom with the use of a gas-solid separation device such as a cyclone and introduced into the recovery unit 21. Besides the cyclone, known separation means such as a bag filter, a ceramic filter, or a shifter can be used, for example.

As described above, according to the conventional technique, if any treatment is not performed on the fluid catalyst, the metal-oxide portion of the fluid catalyst supplied to the inside of the fluid bed reactor 12 generates water when put in the reducing atmosphere. Such generated moisture caused part of the nanocarbon material, especially the non-aggregated nanocarbon material, to disappear. However, the amount of the generated moisture varied depending on the feed amount of the fluid catalyst and could not be controlled.

In contrast to this, if the active metal portion of the fluid catalyst is changed into the exposed metal state by removing the oxide thereof at the stage before being supplied to the fluid bed reactor 12 as in the present invention, no moisture is generated in the fluid bed reactor 12. Thus, the disappearance of the grown nanocarbon material is eliminated, thus increasing the yield of the nanocarbon material.

Thereafter, the catalyst portion is dissolved and removed by the following step, i.e., acid washing in an acid treatment device (not shown) to obtain a nano-sized purified nanocarbon material (for example, a carbon nanotube, a carbon nanofiber, or the like) having undergone the purification.

(Second Embodiment)

Next, another embodiment of the present invention will be described.

Figure 2:
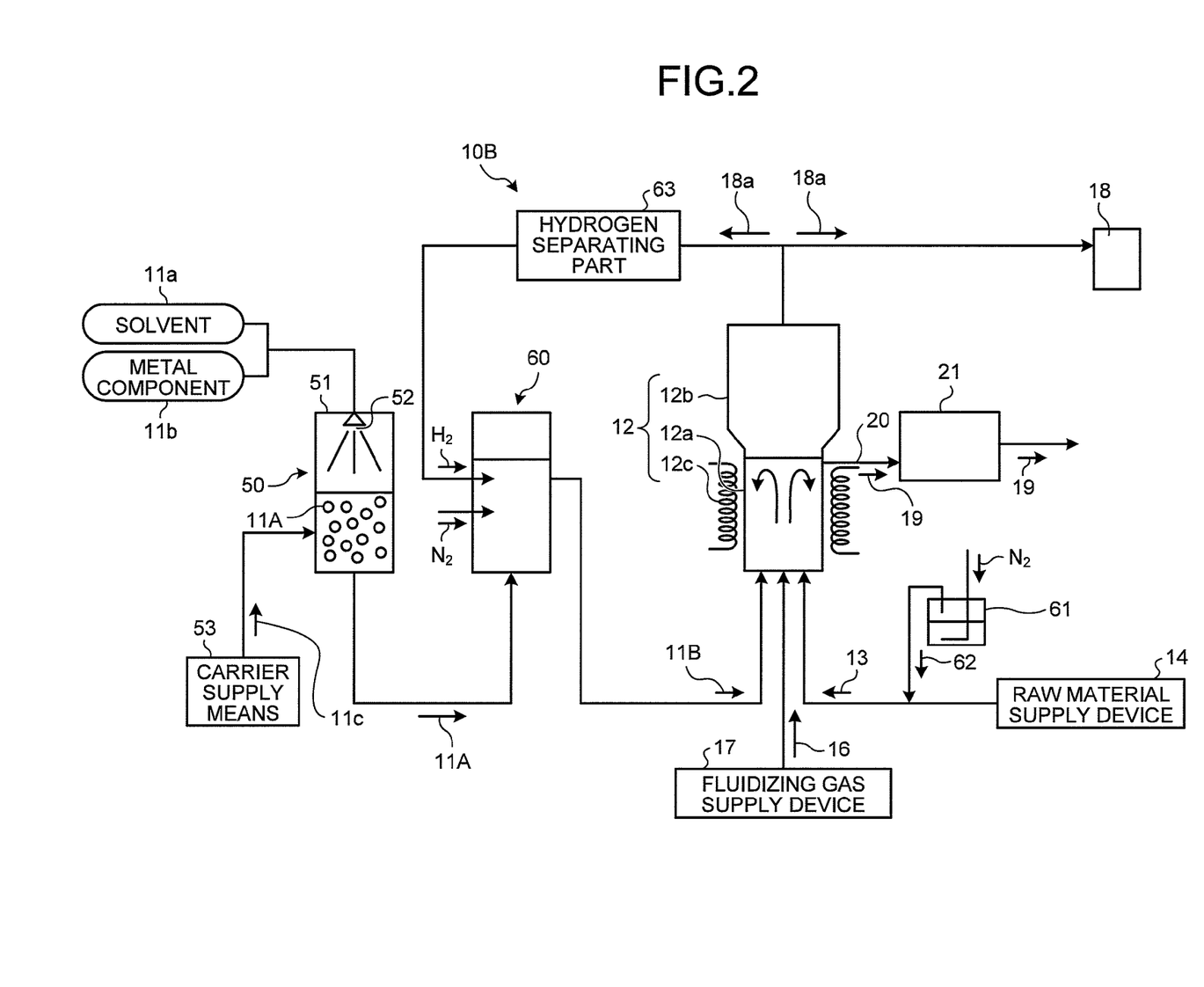
FIG. 2 is a diagrammatic illustration of an apparatus for producing a nanocarbon material according to a second embodiment.

FIG. 2 is a diagrammatic illustration of an apparatus for producing a nanocarbon material according to the second embodiment. The present embodiment illustrates the apparatus capable of continuously performing recovery.

As shown in FIG. 2, in an apparatus 10B for producing a nanocarbon material according to the present embodiment, hydrogen is supplied from the flue gas instead of being supplied separately.

As shown in FIG. 2, since hydrogen is present in the flue gas 18a discharged to the outside from the freeboard part 12b, part of the flue gas 18a is introduced into a hydrogen separating part 63 so as to separate the hydrogen and introduce the separated hydrogen into the reduction basin 60.

Accordingly, hydrogen can be prepared within the apparatus 10B for producing a nanocarbon material without introducing hydrogen from the outside.

(Third Embodiment)

In the present embodiment, the concentration of the metal catalyst is adjusted in the carrier, thereby suppressing even the generation of aggregated nanocarbon materials.

In the present embodiment, a metal of any one or a combination of two or more from among Na, K, Mg, Ca, Sr, Ba, Cr, Mn, Fe, Co, Ni, Mo, W, Ru, Rh, Pd, Ir, Pt, and a lanthanoid element such as La, Ce, and Pr, for example, as well as an oxide, chloride, or nitrate thereof can be used as the metal catalyst.

A promoter of either one or both of Mo and W may be included as the metal catalyst. This is because the addition of a slight amount of the aforementioned promoter such as Mo facilitates the decomposition of the carbon raw material as well as the incorporation of carbon into the active metal such as iron, thus facilitating the formation of the nanocarbon material.

Any one of alumina, silica, sodium aluminate, alum, aluminum phosphate, calcium oxide, calcium carbonate, calcium sulfate, magnesium oxide, magnesium hydroxide, magnesium sulfate, calcium phosphate, and magnesium phosphate, for example, may be cited as the carrier.

It is preferable that the carrier undergo granulation by the catalyst granulation device and thereafter equalization of the particle size thereof, thus being in a range of 0.05 to 10 mm, preferably in a range of 0.4 to 2.0 mm, for example.

Furthermore, the nanocarbon material may be produced with the use of a catalyst that suppresses the aggregation of the active metal by means of an aggregation preventing agent. The aggregation preventing agent is preferably any one or a combination of two or more of alkaline earth metals such as Mg and Ca and alkali metals such as Na and K, for example. Among these, if the aggregation preventing agent is the same as the carrier or contains the same component as the carrier, affinity between the carrier and the aggregation preventing agent is further increased, thereby enhancing the aggregation preventing effect on the active metal.

The carrier supporting this catalyst metal is subjected to the reduction treatment in the reduction basin so as to reduce the oxygen component from the metal of the catalyst metal, thus exposing the active metal on the carrier surface.

While hydrogen is used as the reducing agent in the present embodiment, any reducing agent can be used as long as it changes a metal oxide into a metal state.

Besides hydrogen, a reducing agent such as a compound containing hydrogen (for example, $NH_4$, hydrogen halide, or the like), silane, or disilane can be used.

It is preferable that temperature conditions when performing the reduction treatment in the reduction basin be set in a range of 600 to 900° C., more preferably at around 800° C. The reduction-treated fluid catalyst which has undergone the reduction treatment in the reduction basin is supplied to the fluid bed reactor with the metal portion of the catalyst being exposed. In order to prevent the active catalyst from being reoxidized, the reduction-treated fluid catalyst may be supplied to the fluid bed reactor before its temperature is lowered while maintaining the reducing atmosphere. In other words, the reduced fluid catalysts may be transferred to the fluid bed reactor to generate nanocarbons while being maintained in an inert atmosphere without being open to the air.

The source gas to be supplied to the fluid bed reactor may be any compound as long as it contains carbon. Examples of such a compound may include, in addition to CO and $CO_2$, alkanes such as methane, ethane, propane, and hexane, unsaturated organic compounds such as ethylene, propylene, and acetylene, aromatic compounds such as benzene and toluene, organic compounds having an oxygen-containing functional group such as alcohols, ethers, and carboxylic acids, polymer materials such as polyethylene and polypropylene, and petroleum and coal (including a coal conversion gas). However, the present invention is not limited to these. Alternatively, for the sake of oxygen concentration control, two or more of oxygen-containing carbon sources such as CO, $CO_2$, alcohols, ethers, and carboxylic acids and oxygen-free carbon sources may be combined together and supplied.

This carbon gas is supplied in a gas state to the fluid bed reacting part and undergoes a uniform reaction as a result of stirring by the carrier supporting the active catalyst, which is a fluid material, to grow the nanocarbon material. At this time, an inert gas is separately introduced into the fluid bed reacting part as a fluidizing gas so as to achieve predetermined fluid conditions.

Thereafter, the inside of the fluid bed reacting part is set in a temperature range of 300° C. to 1300° C., more preferably in a temperature range of 400° C. to 1200° C., by the heating part. The nanocarbon material is synthesized by allowing the carbon gas such as methane to be in contact with the catalysts for a certain period of time under a coexistence environment with an impurity carbon decomposed matter.

If moisture in the fluid bed reactor is made zero, amorphous carbon, which is an impurity, is formed in the metal catalyst and the catalyst is prone to lose its activity due to the catalyst metal covered with the amorphous carbon. Thus, a slight amount of moisture is added to remove the amorphous carbon and thereby suppress deterioration in the catalytic activity.

Moreover, in view of the yield and the surface resistivity of a thin film to which nanocarbons are added, if the reaction time is in a range less than or equal to 120 minutes, the nanocarbon material can be produced at a high yield with such an appropriate reaction time. While the nanocarbon material can be generated by allowing the carbon gas such as methane to be in contact with the catalysts for 5 seconds or more under a coexistence environment with an impurity carbon decomposed matter, the contact time may be adjusted depending on desired characteristics of the nanocarbon material.

In the present embodiment, after removing the oxygen component in the catalyst metal by means of the reduction treatment, the nanocarbon material is grown while adding a slight amount of moisture thereto. Therefore, deterioration in the activity of the active metal due to amorphous carbon can be suppressed. Furthermore, the nanocarbon materials can be grown without being aggregated together.

REFERENCE SIGNS LIST 10A, 10B Apparatus for producing a nanocarbon material
11A Fluid catalyst
11B Reduction-treated fluid catalyst
12 Fluid bed reactor
13 Carbon raw material
60 Reduction basin
61 Moisture application basin

The invention claimed is:

1. A method for producing a nanocarbon material, comprising:
   reducing a fluid catalyst having an active metal with a reducing agent;
   growing a nanocarbon material in the active metal of the fluid catalyst by supplying the reduced fluid catalyst, a source gas, and moisture to a fluid bed, wherein for the moisture, a ratio of the moisture/the source gas is in a range of 0.0002 to 0.0008;
   recovering a gas discharged from a fluid bed reactor after growing the nanocarbon material; and
   separating hydrogen from the discharged gas, wherein the separated hydrogen is introduced and used as the reducing agent for reducing the fluid catalyst.

2. The method for producing a nanocarbon material according to claim 1, wherein the reducing agent in the reduction step is hydrogen, $NH_4$, silane, or disilane.

3. The method for producing a nanocarbon material according to claim 1,
   further comprising granulating the fluid catalyst having the active metal so as to have a particle size in a range of 0.05 to 10 mm.

4. The method for producing a nanocarbon material according to claim 1,
   further comprising preventing reoxidation of the reduced fluid catalyst.

5. The method for producing a nanocarbon material according to claim 1, wherein in the growing of the nanocarbon material, the moisture supplied to the fluid bed causes amorphous carbon generated in the active metal to disappear.

6. An apparatus for producing a nanocarbon material, comprising:
   a reduction basin for reducing an active metal;
   a fluid bed reactor that is provided downstream of the reduction basin and is configured to grow a nanocarbon material by means of a reduction-treated fluid catalyst having undergone reduction;
   a gas line that is connected to the fluid bed reactor and is configured to supply a source gas to the fluid bed reactor;
   a moisture application part that is connected to the gas line and is configured to supply a slight amount of moisture to the fluid bed reactor; and
   a hydrogen separator that is provided between the fluid bed reactor and the reduction basin and is configured to separate hydrogen contained in a gas discharged from the fluid bed reactor to introduce the hydrogen into the reduction basin.

7. A method for producing a nanocarbon material, comprising:
   reducing a fluid catalyst having an active metal with a reducing agent;
   growing a nanocarbon material in the active metal of the fluid catalyst by supplying the reduced fluid catalyst, a source gas, and a moisture to a fluid bed;
   recovering a gas discharged from a fluid bed reactor after growing the nanocarbon material; and
   separating hydrogen from the discharged gas, wherein the separated hydrogen is introduced and used as the reducing agent for reducing the fluid catalyst.

8. The method for producing a nanocarbon material according to claim 7, wherein the reducing agent in the reduction step is hydrogen, $NH_4$, silane, or disilane.

9. The method for producing a nanocarbon material according to claim 7, further comprising granulating the fluid catalyst having the active metal so as to have a particle size in a range of 0.05 to 10 mm.

10. The method for producing a nanocarbon material according to claim 7, further comprising preventing reoxidation of the reduced fluid catalyst.

11. The method for producing a nanocarbon material according to claim 7, wherein in the growing of the nanocarbon material, the moisture supplied to the fluid bed causes amorphous carbon generated in the active metal to disappear.

* * * * *